United States Patent [19]
Hedman

[11] Patent Number: 5,538,638
[45] Date of Patent: Jul. 23, 1996

[54] METHOD OF TESTING IV ADMIXTURES FOR CONTAMINANTS

[76] Inventor: Hilary R. Hedman, 349 Brock Rd., Nevada City, Calif. 95959

[21] Appl. No.: 268,162

[22] Filed: Jun. 27, 1994

[51] Int. Cl.$^6$ .................................................. B01D 65/02
[52] U.S. Cl. ........................... 210/636; 210/94; 210/410
[58] Field of Search ............................ 210/94, 408, 409, 210/410, 85, 257.2, 258, 636; 73/64.56; 422/41, 119

[56] References Cited

U.S. PATENT DOCUMENTS

| | | |
|---|---|---|
| 3,951,798 | 4/1976 | Haldopoulos ........................ 210/452 |
| 4,036,698 | 7/1977 | Bush et al. . | 
| 4,640,777 | 2/1987 | Lemonnier . |

OTHER PUBLICATIONS

Addi–Chek Quality Control System, pp. 11–12 (undated).
"Method for Testing the Sterility of Total Nutrient Admixtures" American Journal of Hospital Pharmacy vol. 45 (Jun., 1988).
The United States Pharmacopeia, USP XXII, pp. 1483–1485 (Jan., 1990).
Healthtek Document No. IPA005C "Q.C. Tester" (Sep. 1990).

Primary Examiner—Frank Spear
Attorney, Agent, or Firm—Thomas M. Freiburger

[57] ABSTRACT

A method and apparatus for testing a pharmacological IV admixture for contaminants, following filtering of turbid liquids such as emulsions through a micropore filter, includes the step of first air purging or gas purging residual emulsion particles through the micropore filter using pressure, before admitting a growth medium to the upstream side of the filter. The air purging of these emulsion particles, so that they are substantially removed from the upstream side of the filter, enables the successful sterility testing of the filter by admitting clear growth medium, waiting the required culturing time and observing for turbidity which evidences growth of microbes. The described procedure removes residual emulsion particles simply and effectively so that the visual test is effective. In a preferred embodiment the procedure is carried out using a sealed, sterile growth medium bag connected to the filter assembly, the bag having a quantity of sterile air along with the liquid growth medium. The bag is squeezed to create a pressure differential between the two sides of the filter, pushing residual emulsion particles through the filter and out the outlet end. Then the bag is inverted to admit growth medium to the filter, first squeezing the bag to rinse the filter assembly, then sealing off the filter assembly.

12 Claims, 3 Drawing Sheets

METHOD OF TESTING IV ADMIXTURES FOR CONTAMINANTS

BACKGROUND OF THE INVENTION

This invention concerns sterility in pharmacy procedures, and more particularly the invention is directed to sample testing of intravenous liquid filtering equipment, to determine whether the solution or mixture, prior to filtering, was actually sterile. The invention is directed specifically at situations wherein the usual visual test of the filter, by addition of growth medium to the upstream side of the filter followed by an incubation period, is ineffective because of turbidity of the IV fluid itself.

The problem addressed by the invention involves intravenous injection of either TNA (total nutrient admixtures), antibodies or any medicine that is injected into a patient intravenously, either for a short term in the hospital or over a longer term. This relates to a technique which has been used for some time, the use of an in-line filter in a tube positioned below an IV solution source, for filtration prior to IV injection. The object is to filter out any microbes which might be contained in the IV fluid, directing the filtrate into a sterile IV bag or bottle, then, when the filtration procedure is complete, to check as to whether the procedures used by the medical personnel were aseptic. This filtering and testing normally take place in the pharmacy. The filtered solution goes into a sterile IV container which is used for the actual IV administration. The test is conducted, after filtering is complete, by introducing into the upstream filter housing a growth medium which is supposed to be universal for many types of bacterial microbes as well as fungus, yeast, etc. The growth medium is clear and, after hours or days the microbes, if present, will feed on the growth medium and produce turbidity or cloudiness in an otherwise clear solution.

Regarding the prevalence of this testing, some pharmacies are very diligent about following the procedure of testing their IV admixtures and some pharmacies do no testing at all.

A problem arises with the increasing use of emulsions in IV liquids injected into the patient. TNAs by nature include emulsions and are cloudy. When a filtering procedure is complete using TNAs or other emulsions which are cloudy, a residue is present upstream of the micropore filter. If the growth medium is fed directly into this, it will be impossible to visually detect bacterial or other microbe growth because of the existing cloudiness.

Other tests for culture growth, in the face of this turbidity, are possible but not thorough.

Principal attempts at solving this problem are discussed in the article "Method for Testing the Sterility of Total Nutrient Admixtures" by J. W. Levchuk et al., Vol. 45, June 1988 *American Journal of Hospital Pharmacy*. These have included rinsing techniques with enzymes and surfactants which do help move some of the emulsion particles through the filter, but as concluded in the article, so much repeated rinsing is needed that it is not worthwhile to use these techniques, considering the time and expense involved.

Patents which address the issue of removing filtered materials from micropore filters in a medical environment, for various purposes, include Bush U.S. Pat. No. 4,036,698 and Lemonnier U.S. Pat. 4,640,777. Both these references discuss rinsing of the upstream side of the micropore or membrane type filter for sterility testing. Generally speaking, quite a number of cleaning techniques for filters have been known, including scraping, high-velocity air/water jets, many back flushing strategies including backflushing with lateral removal, and the use of parallel filters with switching of each filter from filter cycle to purge cycle.

Further, it has been known to use air pressure to push remaining liquid material through a micropore filter, where the liquid being filtered is highly valuable. After a cycle of filtration through such a filter medium, a substantial volume of unfiltered liquid often remains on the upstream side of the filter, due to the very small pore size as well as effects of surface tension. One manufacturer's literature mentions that the "hold-up volume" for its filter product is 5 microliters, but that this can be lowered to ½ microliter with "air purge". Thus, air pressure has been used in this general context to "purge" the remaining valuable liquid through the filter, but not for the purpose of clearing the upstream side for sterility testing and not, so far as known to the applicant, to force emulsion particles through the filter.

SUMMARY OF THE INVENTION

The solution described herein is to provide a sealed growth medium bag which is of flexible plastic material, with a small quantity of sterile air (or other sterile gas) in the bag with the growth medium. Instead of hanging the bag in the usual position with the bag's outlet port downward, which would displace the air to the top and immediately feed growth medium into the filter, the method of the invention is to invert the bag with the port upward, connect the port to the upstream end of the filter assembly (which breaks the seal and opens the port in the typical manner), then squeeze the bag to first force the sterile air into the upstream filter chamber and against the filter. This forces a sufficient percentage of the residual emulsion particles (which are soft and somewhat flexible like soap bubbles) through the micropore filter, to the extent that only a small amount of the emulsion remains. The procedure can include rinsing with the growth medium after the air purge. The remaining quantity of emulsion is small enough that, when the bag is inverted to introduce the growth medium into the filter, the fluid is substantially clear. Then after a period of incubation passes, the usual visual detection of turbidity or cloudiness, potentially indicating growth of microbes, is effective.

More broadly speaking, the invention encompasses the procedure of purging at least most of residual emulsion particles through a micropore filter by a form of air purging, by creating a pressure differential between the upstream and downstream sides of the filter, with the lower pressure at the downstream side. This can be accomplished not only by a flexible plastic bag which can be squeezed, but also by the usual rigid glass jar which has clear growth medium with a small quantity of sterile air above. This can be done by using a vented spike with two lumens, in such a way that the air in the bottle is first drawn out and introduced to the filter chamber, followed by the growth medium; withdrawal is accomplished by applying a mild vacuum source at the downstream or outlet end of the filter. The vent lumen has a hydrophobic, bacterial retentive filter membrane.

Thus, the invention encompasses a specific method of "air purging" a micropore filter of emulsion particles, by means of a differential pressure between the two sides of the filter. This is particularly important in the specific context of pharmacological products, where sample testing is conducted to determine whether procedures, solutions and solutions containing emulsions are sterile.

The method and system of the invention are directed not so much to the situation where off the shelf sealed sterile solutions are to be used in the IV procedure, but more to the situation where a pharmacist or hospital personnel must mix other ingredients or pharmaceuticals into the IV solution, thus introducing more opportunity for contamination.

The sterile gas used for purging can be air or other gas such as carbon dioxide, nitrogen, etc. Oxygen-free gases are needed in the case of testing for anaerobes, which thrive in low-oxygen or oxygen-free environments.

What usually occurs with these emulsion IV liquids is that at the end of the filtering procedure, a few cubic centimeters of the liquid are left near the bottom of the filter container and droplets are spread around the inside wall of the transparent plastic container. The liquid remaining in the filter container will consist of richer and larger particles (the size of the particles is distributed generally as a Gaussian curve), so that the pressure is needed to help push these larger particles through the filter. A good practitioner will shake the filter tube down like a thermometer, so that almost all the droplets which were held on the wall by surface tension are collected in the liquid at the bottom, prior to doing the purging procedure.

The procedure of the invention, in a preferred embodiment, avoids the need for hydrophobic air vents, by use of a sealed, sterile flexible bag with growth medium, whereby no venting is needed. The "air purge" dramatically reduces the quantity of rinse fluid needed to reach the desired level of cleanliness in the filter chamber. With prior art rinsing, the contaminating substance is merely diluted as more rinse fluid is introduced into the filter chamber. Air purging pushes the undesirable substance through the filter before the rinse fluid is even introduced. Also, air or other gas is typically less expensive than rinse fluids.

Some prior testing techniques have required three rinsing cycles using three separate bottles of rinse fluid. The idea is to rinse, let the chamber run dry, rinse again, etc., for three times. One embodiment of the invention can provide sufficient gas and rinse fluid to accomplish three or more rinse/dry cycles without ever removing the single flexible container. This can be accomplished by turning the bag either up or down depending upon whether the operator wants gas or rinse fluid to come out of the outlet port. Usually, however, only one air purge and one rinse are required.

It is therefore among the objects of the invention to improve and make more effective the testing of micropore filters used for pharmacological products, by a straightforward procedure whereby emulsion particles left behind in the micropore filter are pushed through the filter by gas pressure before introduction of clear growth medium for sterility testing. These and other objects, advantages and features of the invention will be apparent from the following description of a preferred embodiment, considered along with the accompanying drawings.

DESCRIPTION OF PREFERRED EMBODIMENTS

Figure 1:
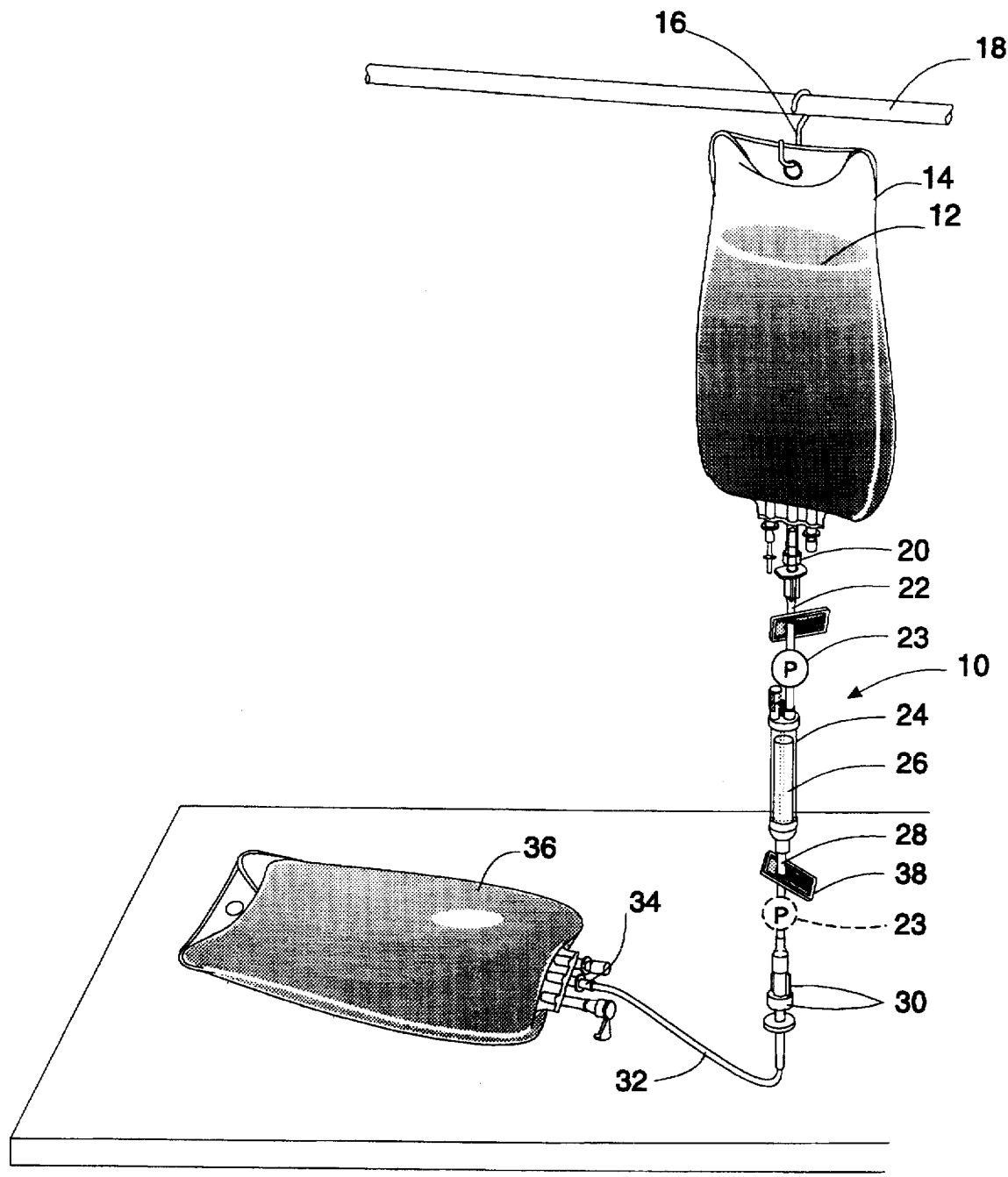
FIG. 1 is a perspective view showing the use of an in-line micropore filter to filter intravenous admixture into an IV administration bag.

FIG. 1 shows a typical use of a micropore filter assembly 10 as a filter for filtration of an admixture liquid 12 before use in IV injection to a patient. The IV fluid admixture 12 is contained normally in a flexible bag 14 and as indicated can be hung on a hook 16, from a bar 18. Liquid admixture 12 flows from the bag 14 down through an outlet port 20 and into an inlet tube 22 of the filter assembly 10. Although the flow of the liquid can be by gravity, normally this is accomplished using a pump 23, located to deliver positive pressure from above the filter assembly 10 as shown in solid lines, or positioned below the filter assembly 10 as shown by the pump 23 indicated in dashed lines in the drawing. The liquid enters a clear plastic chamber or housing 24 of the filter, and passes through a micropore filter medium or membrane 26, tubular in the preferred form of the filter shown. The liquid must pass through the filter membrane 26 in order to reach an outlet tube 28 of the filter assembly. From there the filtered liquid passes through fittings 30 and a receiving bag inlet tube 32 and thence through the inlet port 34 and into the receiving bag 36. This is a typical filtration procedure for an IV admixture, normally conducted in a pharmacy, prior to bringing the receiving IV bag 36 to the patient for the IV procedure. It should be understood that as an alternative assist to gravity, the bag 36 can be replaced by an empty bottle which holds a vacuum, pulling the liquid through the filter assembly 10.

As explained earlier, the liquid admixture 12 in a growing number of cases will contain an emulsion, with inherent turbidity. In such cases a residue of emulsion, with a relatively large distribution of large emulsion particles, will be left behind in the transparent filter container 24, on the upstream side of the filter medium 26. This cloudy residue needs to be minimized before a sterility test can be effectively conducted with clear growth medium, looking for emerging turbidity during incubation.

By the procedures of the invention, the filter assembly 10 is first removed from the bag 14 and the receiving bag 36, by first closing a clamp 38 to seal the distal end of the filter assembly, then removing the assembly from the receiving bag via the connections 30. The receiving bag or the tubing 32 has been clamped or otherwise sealed off at this point.

Next the filter assembly inlet tube 22 is removed from the outlet port 20 of the admixture bag 14, and this is usually accomplished by pulling a spike from the bag 14's outlet, generally at 20.

Figure 2:
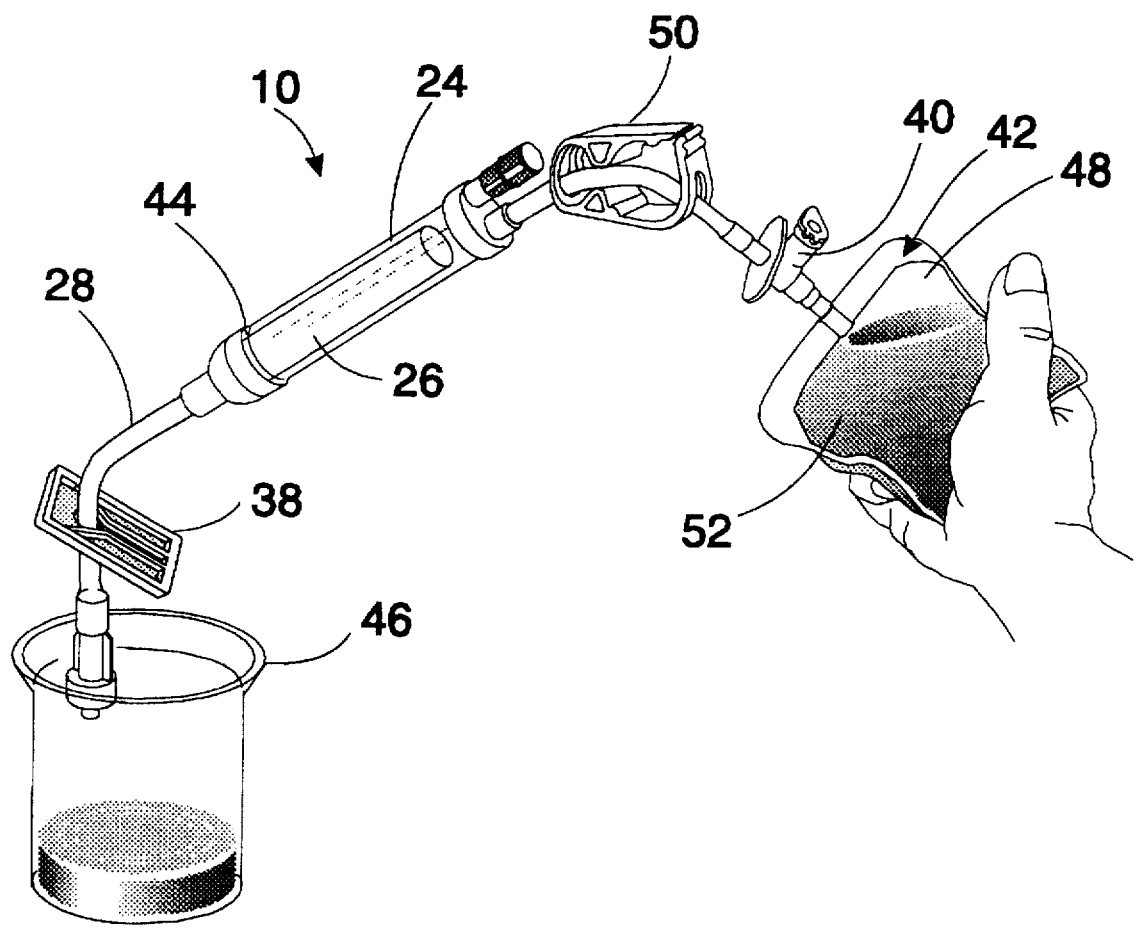
FIG. 2 is a perspective view showing the filter as removed from the admixture container and connected to a growth medium container bag for air purging of residual emulsions prior to introduction of growth medium to the filter.

The filter's inlet tube 22, preferably by a spike (not shown) is then inserted into a spike port 40 of a growth medium container bag 42, as shown in FIG. 2. Either just before or just after this connection step, the best practice is to shake the filter container tube 24 in the manner of a thermometer, in order to collect residual liquid droplets which have clung to the inside of the transparent container 24 down at a bottom, outlet end 44 of the filter container tube.

As shown in FIG. 2, the distal end or outlet tube 28 of the filter assembly may be directed into a beaker 46 for collection of rinse liquid. The user first holds the sterile growth medium bag 42 in the position shown in FIG. 2, such that a pocket 48 of sterile air is displaced to the top of the bag and adjacent to the outlet port 40. Preferably the filter assembly 10 is more inclined toward upright during air purging, to first collect liquid at the bottom of the filter chamber 24 as much as possible before air purging. In this position the user squeezes the bag 42 to create air pressure pushing into the filter chamber 24 on the upstream side of the filter 26. This air purging, using the sterile air from the bag 42, forces most remaining liquid residue with emulsion particles, through the filter medium 26. As explained before, the residual emulsion particles generally are among the larger particles of the particle size spectrum, since these are the particles which tend more to be held behind by the filter medium 26. The air pressure causes these flexible emulsion particles to squeeze through the micropores of the micropore filter medium 26, behaving somewhat similar to soap bubbles.

The air purging step is conducted with the tube clamp 38 moved to the open position as shown in FIG. 2, so that the residual liquid can be pushed through the assembly and down into the beaker 46. An upper tube clamp 50 is of course also open.

Figure 3:
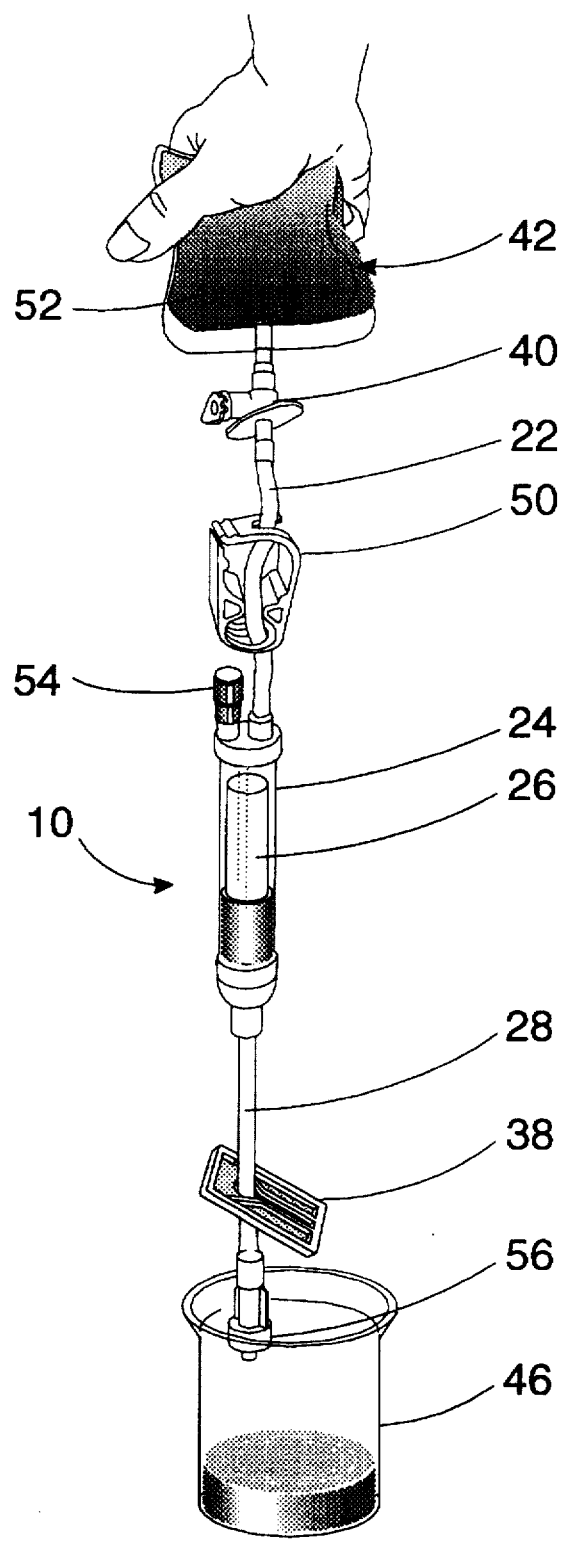
FIG. 3 is a view showing the same equipment and indicating growth medium being admitted to the filter and filter chamber for rinsing with the medium, prior to incubation of the filter containing the medium.

Although the medium could now be introduced into the filter chamber 24 and the filter system sealed off for a period of incubation, with good results in some cases, it is preferable to first rinse the filter with growth medium liquid 52 from the bag 42 before sealing off. Even after shaking, emulsion remains on the chamber walls, usually in such volume that the rinse is needed to dislodge these droplets to obtain clarity for the test procedure. This step can be conducted as shown in FIG. 3, by inverting the bag 42 as shown, with the outlet port 40 downward. With both clamps 50 and 38 open, the bag 42 is squeezed to push a quantity of the clear growth medium, e.g. about 40 to 80 cc of the medium, down through the filter 26 in a rinsing step. Agitation of the filter chamber 24 during rinsing will help remove emulsion particles. The purged residual admixture and medium used for this rinsing are collected in the beaker 46 and discarded.

Generally a single rinse, monitored visually by the practitioner until clarity is attained in the filter chamber, is sufficient. At the end of the rinse the filter chamber can be sealed off. However, to assure thorough purging of residual emulsions, the practitioner can do several repetitions of the air purge/rinse procedure. These repetitions effect a serial dilution of the remaining emulsion and are very effective in purging nearly 100% of the residual emulsion through the filter.

In either event, the final purging step preferably is a rinse, and after the bag is squeezed for this rinse, the clamp 38 is closed at the distal end of the filter assembly. If a vented spike 54 is provided on the proximal end of the filter chamber 24 as shown in FIG. 3, this has been closed during the entire purging operation. The proximal end clamp 50 is now closed and the filter's inlet tube 22 is disconnected from the port 40 of the growth medium bag 42. A cover is replaced onto the connecting spike (not shown) at the inlet end of the tube 22. A cover (not shown) is also replaced on the distal end 56 of the filter's outlet tube 28.

The filter assembly 10 is now sealed off, with the chamber or container 24 full of growth medium, virtually devoid of emulsion particles and possibly containing microbial contaminants in the filter medium 26. The filter assembly 10 is placed in an incubator, set to a temperature range selected by the placement, and the practitioner checks for turbidity, preferably on a daily basis, for not less than a prescribed incubation period such as seven or fourteen days. An emergence of turbidity in the transparent filter chamber 24 indicates microbial contamination of the filter, due to contamination of the IV admixture or non-sterile techniques in handling.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A method for removing at least most of residual emulsion particles from a micropore filter following filtration of an admixture containing emulsion using the micropore filter, comprising:

providing a flexible bag containing microbe growth medium and gas, the contents being sterile, with an outlet port at one end of the bag, connecting the outlet port to the upstream side of the filter, and positioning the bag so that the outlet port is at or near the upper end of the bag, such that gas and not liquid is exposed to the outlet port, purging the micropore filter of residual emulsion particles contained upstream of the filter, by squeezing the bag to force gas against the upstream side of the filter thereby moving gas through the filter and drawing residual emulsion particles through the filter to purge most of the residual emulsion particles through the micropore filter, and then inverting the bag and admitting the liquid growth medium to the upstream side of the filter, and including leaving the growth medium in contact with the filter for a period of time sufficient to incubate a culture of microbes which might be trapped on or in the micropore filter, in a test of the sterility of the filter following the filtration of said emulsion, the filter having an outer wall at least a portion of which is transparent, allowing visual observation for possible turbidity arising during incubation.

2. The method of claim 1, wherein the micropore filter comprises a chamber having a generally cylindrical transparent outer wall, with a micropore filter medium contained within the chamber, between an upper inlet and a lower outlet of the chamber.

3. The method of claim 1, wherein the step of inverting the bag and admitting the liquid growth medium further includes squeezing the bag to force growth medium through the micropore filter, thus rinsing the filter, then closing the filter chamber for incubation.

4. A method for testing for sterility of a pharmacological liquid admixture via a filter assembly used for filtration of the liquid admixture, wherein the liquid filtered is cloudy by nature, containing emulsions, and wherein the filter assembly includes a casing having a substantially transparent portion permitting visual inspection, comprising:

filtering the liquid admixture by connecting a container of the admixture to the upstream side of a filter assembly, and a receiving container to the downstream side of the filter assembly, and moving the admixture through the filter assembly, following filtration, removing the filter assembly from the admixture container and from the receiving container and connecting the upstream side of the filter assembly to a growth medium container which contains clear liquid growth medium and gas, the contents of the growth medium container being sterile, establishing a pressure differential between the upstream and downstream sides of the filter assembly, with lower pressure at the downstream side and with the growth medium container positioned to communicate gas to the upstream side of the filter assembly, thereby moving gas through the filter and forcing residual liquid admixture with emulsion particles through the filter and out the downstream side of the filter assembly, thus gas purging the filter of most emulsion particles, then admitting the clear liquid growth medium to the filter assembly and into contact with a filter medium of the assembly, sealing off both sides of the filter assembly and incubating the contents of the sealed filter assembly for a prescribed period of time, and inspecting the filter assembly for emerging turbidity indicating growth of microbes.

5. The method of claim 4, further including, before the step of establishing a pressure differential, the step of shaking the filter assembly to cause liquid droplets contained on the casing of the filter assembly to collect at a bottom side of the filter assembly, upstream of the filter medium.

6. The method of claim 4, wherein the step of creating a pressure differential comprises said growth medium container being a flexible bag with an outlet port, and including the step of first holding the bag with the outlet port upward, so that only gas and not liquid contained in the bag is in communication with the outlet port, and squeezing the bag to force gas pressure against and through the filter medium to gas purge the filter medium.

7. The method of claim 6, further including, prior to sealing of the filter assembly for incubation, the step of rinsing the filter medium by forcing a quantity of liquid growth medium through the filter assembly.

8. The method of claim 7, wherein the rinsing step includes inverting the growth medium bag following the step of gas purging the filter medium, and squeezing the growth medium bag to force growth medium through the filter, thus rinsing the filter.

9. The method of claim 4, further including prior to sealing of the filter assembly for incubation, the step of rinsing the filter medium by forcing a quantity of liquid growth medium through the filter assembly.

10. The method of claim 9, wherein the sealing off of the filter assembly is performed immediately upon completion of the rinsing step, thus capturing liquid growth medium within the filter assembly.

11. A system for purging emulsions from a filter assembly which has been used to filter a liquid admixture containing the emulsions, the filter assembly having a substantially transparent outer casing permitting visual inspection of the liquid within the casing, and for admitting sterile, clear liquid growth medium to the filter assembly after purging of emulsions, for a test for microbes which may have contaminated the liquid admixture filtered, comprising:

a growth medium container comprising a flexible bag containing sterile liquid growth medium and a quantity of sterile gas, the bag having an outlet port, a filter assembly comprising a filter medium, an outer filter casing at least a portion of which is substantially transparent permitting visual inspection, a filter inlet port leading to an upstream side of the filter medium and a filter outlet port leading from a downstream side of the filter medium, and means connecting the outlet port of the growth medium container to the filter inlet port of the filter assembly, whereby the flexible growth medium container can be selectively positioned so as to communicate either gas or liquid growth medium to the upstream side of the filter assembly, and whereby the flexible bag permits squeezing to push gas or liquid growth medium through the filter assembly.

12. The system according to claim 11, wherein the flexible bag comprising the growth medium container is arranged in a position with its outlet port oriented generally upwardly, exposing the sterile gas and not the liquid growth medium to the outlet port of the container such that when squeezed, the flexible bag will force gas through the filter assembly.

* * * * *